United States Patent
Sunaga et al.

(10) Patent No.: US 9,472,874 B1
(45) Date of Patent: Oct. 18, 2016

(54) COMMUNICATION MODULE AND COMMUNICATION MODULE CONNECTOR

(71) Applicant: Hitachi Metals, Ltd., Minato-ku, Tokyo (JP)

(72) Inventors: Yoshinori Sunaga, Hitachinaka (JP); Masataka Sato, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 15/003,406

(22) Filed: Jan. 21, 2016

(30) Foreign Application Priority Data

Jun. 9, 2015 (JP) ................................. 2015-116239
Sep. 29, 2015 (JP) ................................. 2015-190537

(51) Int. Cl.
*H01R 12/70* (2011.01)
*H01R 13/502* (2006.01)

(52) U.S. Cl.
CPC ........ *H01R 12/7076* (2013.01); *H01R 13/502* (2013.01)

(58) Field of Classification Search
CPC ............ H01R 12/721; H01R 13/6587; H01R 12/724
See application file for complete search history.

(56) References Cited

U.S. PATENT DOCUMENTS

| | | | | |
|---|---|---|---|---|
| 6,135,809 A * | 10/2000 | Asakawa | ........... | H01R 13/7031 439/260 |
| 7,048,573 B2 * | 5/2006 | Masaki | ................... | H01R 12/89 439/492 |
| 7,666,015 B2 * | 2/2010 | Sakamoto | ............ | H01R 13/629 439/260 |
| 8,439,691 B1 * | 5/2013 | Lan | ....................... | H01R 12/724 439/660 |
| 2004/0192096 A1 * | 9/2004 | Sato | ..................... | G06K 7/0004 439/188 |
| 2011/0223790 A1 * | 9/2011 | Hoshino | .............. | H01R 13/641 439/329 |
| 2013/0089991 A1 | 4/2013 | Ito | | |
| 2013/0109202 A1 * | 5/2013 | Szczesny | ............... | G02B 6/428 439/62 |

FOREIGN PATENT DOCUMENTS

JP          2013-84577 A          5/2013

* cited by examiner

*Primary Examiner* — Briggitte R Hammond
(74) *Attorney, Agent, or Firm* — Crowell & Moring LLP

(57) ABSTRACT

A communication module includes a plug connector, the plug connector has an insertion projection, the insertion projection has a board insertion portion into which an insertion end portion of a module board is inserted formed therein, a plurality of first adjustment projections are provided on an upper surface of the board insertion portion, and a plurality of second adjustment projections are provided on a lower surface of the board insertion portion. The first adjustment projections and the second adjustment projections are arranged alternately along the width direction of the board insertion portion, the first adjustment projections come in contact with a top surface of the insertion end portion which is opposed to the upper surface of the board insertion portion, and the second adjustment projections come in contact with the back surface of the insertion end portion which is opposed to the lower surface of the board insertion portion.

10 Claims, 10 Drawing Sheets

COMMUNICATION MODULE AND COMMUNICATION MODULE CONNECTOR

CROSS-REFERENCE TO RELATED APPLICATION

The present application claims priority from Japanese Patent Applications No. 2015-116239 filed on Jun. 9, 2015 and No. 2015-190537 filed on Sep. 29, 2015, the contents of which are hereby incorporated by reference into this application.

TECHNICAL FIELD OF THE INVENTION

The present invention relates to a communication module and to a communication module connector.

BACKGROUND OF THE INVENTION

A board incorporated in so-called IT (Information Technology) devices such as servers and network equipment is generally referred to as "motherboard," and a plurality of communication modules are connected to such a motherboard.

Here, to achieve higher performance and further reduced power consumption of an IT device and the like, it is necessary to further miniaturize each communication module and mount as many communication modules as possible on a housing panel (front panel or rear panel) of the IT device and the like. More specifically, it is necessary to reduce the width of each communication module so that a plurality of communication modules are mounted on a housing panel of a given size at high density.

One method of reducing the width of the communication module is to reduce the pitch of electrodes formed on a connector connecting the motherboard to the communication module. This connector has been conventionally known as a two-piece structure connector composed of a male connector (plug connector) and a female connector (receptacle connector) and having electrodes arranged at a narrow pitch.

When the two-piece structure connector is used to connect the communication module to the motherboard, the communication module is provided with the plug connector, and the motherboard is provided with the receptacle connector in many cases. Also, the communication module may be provided with a card edge type connector. This is because the card edge type connector is suitable for providing a plurality of electrodes having stable quality at low cost. The card edge type connector, however, has low accuracy and is therefore unsuitable for reducing the pitch of electrodes (see, e.g., Japanese Patent Application Laid-Open Publication No. 2013-84577 (Patent Document 1)).

SUMMARY OF THE INVENTION

When a communication module is provided with a plug connector, a board incorporated in the communication module and the plug connector must be fixed together firmly with a high degree of accuracy. Thus, in a conventional case shown in FIGS. 9 and 10, a plug connector 80 is provided with a board holding portion 81. Note that, in the following description, to distinguish a board incorporated in an IT device and the like from a board incorporated in a communication module to be connected to the former board, the former board may be referred to as "motherboard" and the latter board as "module board."

As shown in FIGS. 9 and 10B, the board holding portion 81 has an outline that is generally U-shaped in a plan view and encircles an end of a module board 82 to hold that end. However, when the plug connector 80 is provided with the board holding portion 81, the width (W) of the plug connector 80 increases as a whole. Specifically, the left and right parts of the board holding portion 81 create an additional width of about 1 to 2 mm in total to the width (W) of the plug connector 80. In other words, the board holding portion 81 overhangs outward from both sides of the module board 82. As a result, the total width of the communication module provided with the plug connector 80 inevitably increases, which is a hindrance to miniaturization and high-density mounting of the communication module.

The object of the present invention is to further miniaturize a communication module to achieve an improvement in the mounting density of the communication module.

A communication module according to the present invention includes a plug connector connected to a receptacle connector. The plug connector has an insertion projection inserted into an insertion recess provided on the receptacle connector, and a board insertion portion into which an insertion end portion of a module board incorporated in the communication module is inserted is formed in the insertion projection. A plurality of first adjustment projections parallel to each other are provided on a first inner surface of the board insertion portion, and a plurality of second adjustment projections parallel to each other are provided on a second inner surface of the board insertion portion which is opposed to the first inner surface. The first adjustment projections and the second adjustment projections are arranged alternately along an arrangement direction of these adjustment projections, the first adjustment projections come in contact with a surface of the insertion end portion which is opposed to the first inner surface, and the second adjustment projections come in contact with another surface of the insertion end portion which is opposed to the second inner surface.

A communication module connector according to the present invention includes a plug connector and a receptacle connector to which the plug connector is connected. The plug connector has an insertion projection, and the receptacle connector has an insertion recess into which the insertion projection is inserted. A board insertion portion into which an insertion end portion of a module board incorporated in a communication module including the plug connector is inserted is formed in the insertion projection. A plurality of first adjustment projections parallel to each other are provided on a first inner surface of the board insertion portion, and a plurality of second adjustment projections parallel to each other are provided on a second inner surface of the board insertion portion which is opposed to the first inner surface. The first adjustment projections and the second adjustment projections are arranged alternately along an arrangement direction of these adjustment projections, the first adjustment projections come in contact with a surface of the insertion end portion which is opposed to the first inner surface, and the second adjustment projections come in contact with another surface of the insertion end portion which is opposed to the second inner surface.

According to the present invention, a communication module is further miniaturized, and therefore an improvement in the mounting density of the communication module is achieved.

BRIEF DESCRIPTIONS OF THE DRAWINGS

DESCRIPTIONS OF THE PREFERRED EMBODIMENTS

An embodiment of the present invention will hereinafter be described in detail. A communication module according to this embodiment is connected to a motherboard incorporated in an IT device and the like via a communication module connector. The communication module connector that connects the communication module of this embodiment to the motherboard is a two-piece structure connector composed of a male connector incorporated in the communication module and a female connector incorporated in the motherboard. In the following description, the male connector incorporated in the communication module is referred to as "plug connector," the female connector incorporated in the motherboard is referred to as "receptacle connector," and both connectors may be collectively referred to as "connector." Specifically, the communication module of this embodiment includes the plug connector that can be inserted into and extracted from the receptacle connector incorporated in the motherboard, and the communication module and the motherboard are connected to each other via these plug connector and receptacle connector.

The motherboard, to which the communication module is connected in the above manner, carries a communication semiconductor chip mounted thereon, and the communication module connected to the motherboard is thus connected to the communication semiconductor chip via electric wiring formed on the motherboard. Moreover, the motherboard carries a plurality of receptacle connectors arranged thereon, and a plurality of communication modules are connected to the communication semiconductor chip via respective receptacle connectors.

Figure 1A:
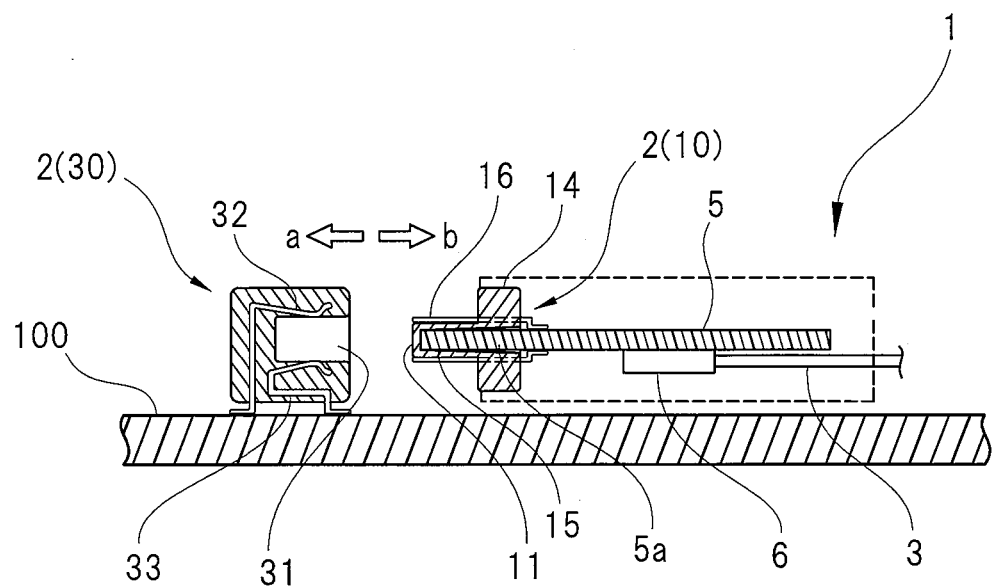
FIG. 1A is a sectional view showing an example of a communication module and a communication module connector.

As shown in FIG. 1, a plug connector 10 incorporated in a communication module 1 of this embodiment has an insertion projection 11. A receptacle connector 30 incorporated in a motherboard 100, on the other hand, has an insertion recess 31. The insertion projection 11 of the plug connector 10 is inserted into the insertion recess 31 of the receptacle connector 30 along the direction of an arrow a (insertion direction) shown in FIG. 1A and is extracted from the insertion recess 31 of the receptacle connector 30 along the direction of an arrow b (extraction direction). When the insertion projection 11 of the plug connector 10 is inserted into the insertion recess 31 of the receptacle connector 30, electrodes provided on the plug connector 10 and receptacle connector 30, respectively, come in contact with each other. As a result, the communication module 1 and the motherboard 100 are electrically connected to each other via a connector 2, and this allows signal transmission/reception (input/output) between the communication module 1 and the communication semiconductor chip mounted on the motherboard 100.

Figure 2:
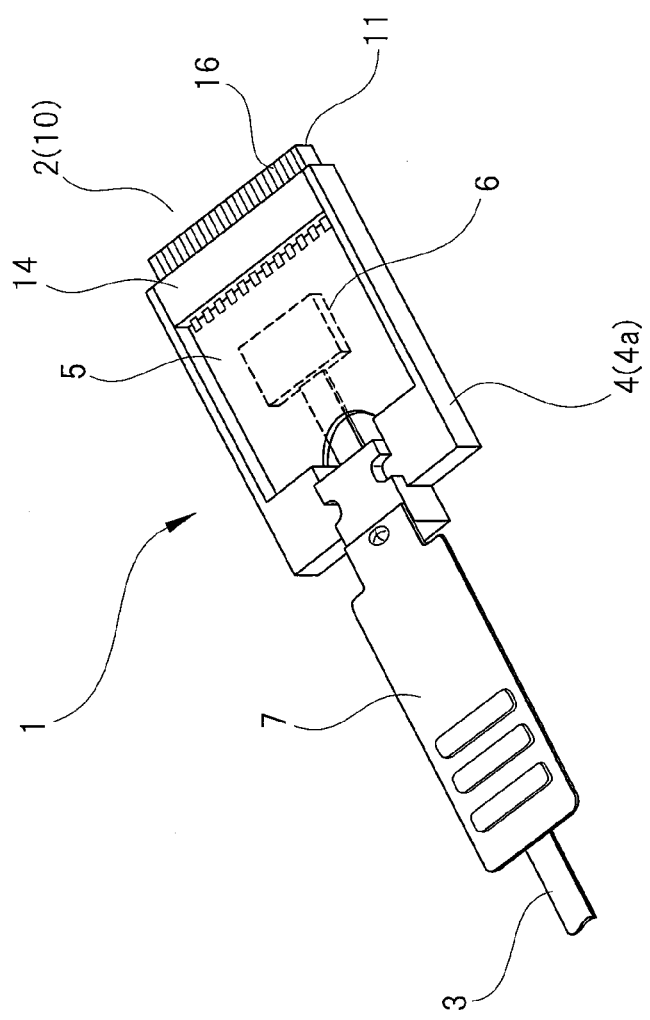
FIG. 2 is a perspective view showing an example of the internal structure of the communication module.

As shown in FIG. 2, the communication module 1 includes a housing 4 into which one end of an optical fiber (fiber ribbon) 3 is led and a module board 5 housed in the housing 4, and the module board 5 has a photoelectric conversion unit 6 provided thereon. Note that the housing 4 is composed of a lower case 4a shown in FIG. 2 and an upper case not shown in FIG. 2. The lower case 4a and the upper case are abutted against each other to make up the housing 4 having a space in which the module board 5 can be placed.

Moreover, though not depicted in FIG. 2, the photoelectric conversion unit 6 includes at least a light-emitting element, a driving IC (Integrated Circuit) that drives the light-emitting element, a light-receiving element, and an amplifying IC that amplifies a signal output from the light-receiving element. The module board 5 is provided with a lens block that optically connects the light-emitting element, the light-receiving element, and the optical fiber 3. One end of the optical fiber 3 led into the housing 4 is (optically) connected to the lens block via an MT (Mechanically Transferable) connector. Specifically, the front end surface of the MT connector is abutted against the abutting surface of the lens block. Moreover, a pair of guide pins is projected from the abutting surface of the lens block, and these guide pins are inserted into guide holes formed on the front end surface of the MT connector. Note that, in this embodiment, the light-emitting element is provided as a VCSEL (Vertical Cavity Surface Emitting Laser) and the light-receiving element is provided as a PD (Photodiode). These light-emitting element and light-receiving element are, however, not limited to specific light-emitting elements and light-receiving elements. Also, the rear end of the housing 4 is attached with a pull-tab 7, which is held to extract the plug connector 10 from the receptacle connector 30 (FIG. 1).

Figure 1B:
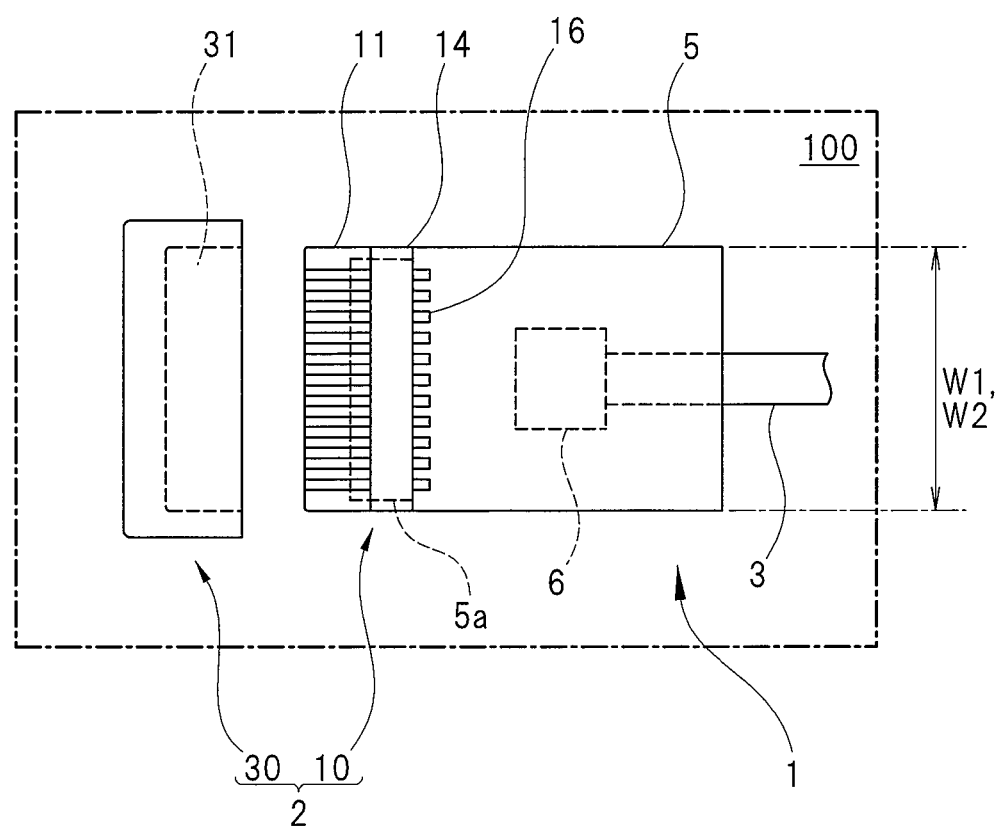
FIG. 1B is a plan view showing the communication module and the communication module connector.

Referring to FIG. 1 again, the insertion projection 11 of the plug connector 10 is tabular, and a flange 14 is formed integrally behind the insertion projection 11. In other words, the insertion projection 11 projects from the front surface of the flange 14. As shown in FIG. 1B, the width (W1) of the insertion projection 11 and of the flange 14 is the same as the maximum width (W2) of the module board 5. In other words, the width (W1) of the plug connector 10 is the same as the maximum width (W2) of the module board 5. The plug connector 10, therefore, does not overhang outward from both sides of the module board 5, and both side surfaces of the plug connector 10 are completely or almost flush with both side surfaces of the module board 5.

Figure 3:
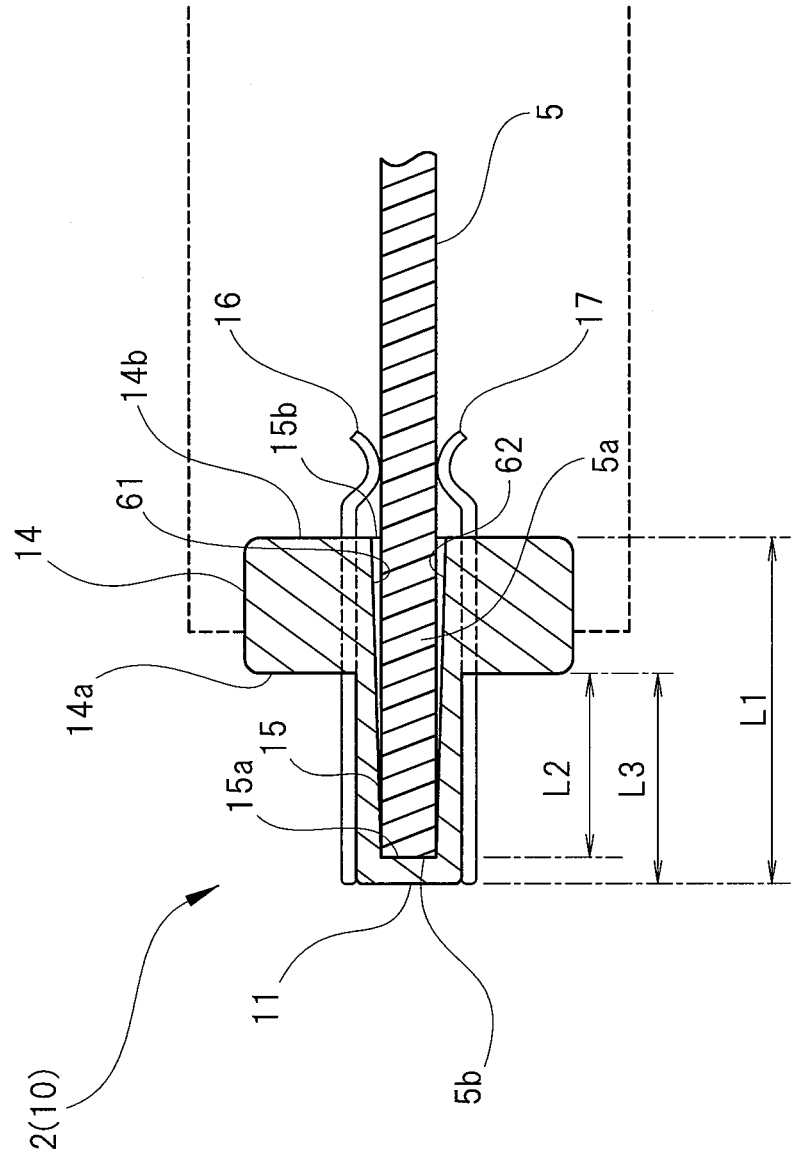
FIG. 3 is an enlarged sectional view (side sectional view) showing an example of the connection structure of a plug connector and a module board.

As shown in FIG. 3, a part of the module board 5 is inserted into the inside of the plug connector 10. Specifically, a board insertion portion 15 which is open to the outside at the rear surface 14b of the flange 14 is formed inside the plug connector 10. This board insertion portion 15 has the same shape as the shape of an end of the module board 5, and the end of the module board 5 is inserted into the board insertion portion 15. More specifically, as shown in FIG. 1B, an insertion end portion 5a slightly smaller in width than the other part of the module board 5 is formed at one end in the longitudinal direction of the module board 5, and this insertion end portion 5a is inserted into the board insertion portion 15 (FIG. 3). In other words, the part of the end of the module board 5 that is inserted into the board insertion portion 15 (FIG. 3) is the insertion end portion 5a. Also, the maximum width (W2) of the module board 5 shown in FIG. 1B represents the width of the part of the module board 5 other than the insertion end portion 5a.

As shown in FIG. 3, a part of the full length (L1) of the insertion end portion 5a is inserted into the insertion projection 11 so as to reach the inside of the insertion projection 11 beyond the flange 14. Specifically, the insertion end portion 5a is inserted into the board insertion portion 15 until a front end surface 5b of the insertion end portion 5a abuts against and comes in contact with a bottom surface 15a of the board insertion portion 15, and the insertion length (L2) of the insertion end portion 5a to the insertion projection 11 is substantially the same as the full length (L3) of the insertion projection 11.

Here, the plug connector 10 is manufactured by injection molding, so that the board insertion portion 15 has high dimensional accuracy. The module board 5 (insertion end portion 5a) inserted into the board insertion portion 15, therefore, is fixed firmly and with a high degree of accuracy to the plug connector 10.

As shown in FIG. 1, a plurality of first electrodes are provided on the outer surface of the insertion projection 11. Specifically, as shown in FIG. 3, a plurality of upper first electrodes 16 are provided on the upper surface of the insertion projection 11, and a plurality of lower first electrodes 17 are provided on the lower surface of the insertion projection 11. As shown in FIG. 1B, the upper first electrodes 16 are arranged at a given pitch (0.5 mm pitch according to this embodiment) along the width direction of the insertion projection 11. Though not depicted in FIG. 1B, the lower first electrodes 17 (FIG. 3) are also arranged at the same pitch as the upper first electrodes 16 along the width direction of the insertion projection 11.

As shown in FIG. 3, each of the upper first electrodes 16 and lower first electrodes 17 is strip-shaped and passes through the flange 14 to extend in the insertion/extraction direction of the plug connector 10. One end (front end) of each of the upper first electrodes 16 and lower first electrodes 17 projects from the front surface 14a of the flange 14 and reaches substantially at the same position as the front end of the insertion projection 11, and the other end (rear end) of each of the upper first electrodes 16 and lower first electrodes 17 projects from the rear surface 14b of the flange 14. The rear end of the upper first electrode 16 and the rear end of the lower first electrode 17 are opposed to each other, and the insertion end portion 5a of the module board 5 is inserted into the board insertion portion 15 through a space between the rear end of the upper first electrode 16 and the rear end of the lower first electrode 17. In other words, the upper first electrode 16 and the lower first electrode 17 are opposed to each other across the module board 5. The rear end of the upper first electrode 16 is soldered to an electrode pad (not depicted) formed on the top surface of the module board 5, and the rear end of the lower first electrode 17 is soldered to an electrode pad (not depicted) formed on the back surface of the module board 5. Note that each upper first electrode 16 is positioned by being partially fitted in a groove formed on the upper surface of the insertion projection 11, and each lower first electrode 17 is positioned by being partially fitted in a groove formed on the lower surface of the insertion projection 11.

Figure 4:
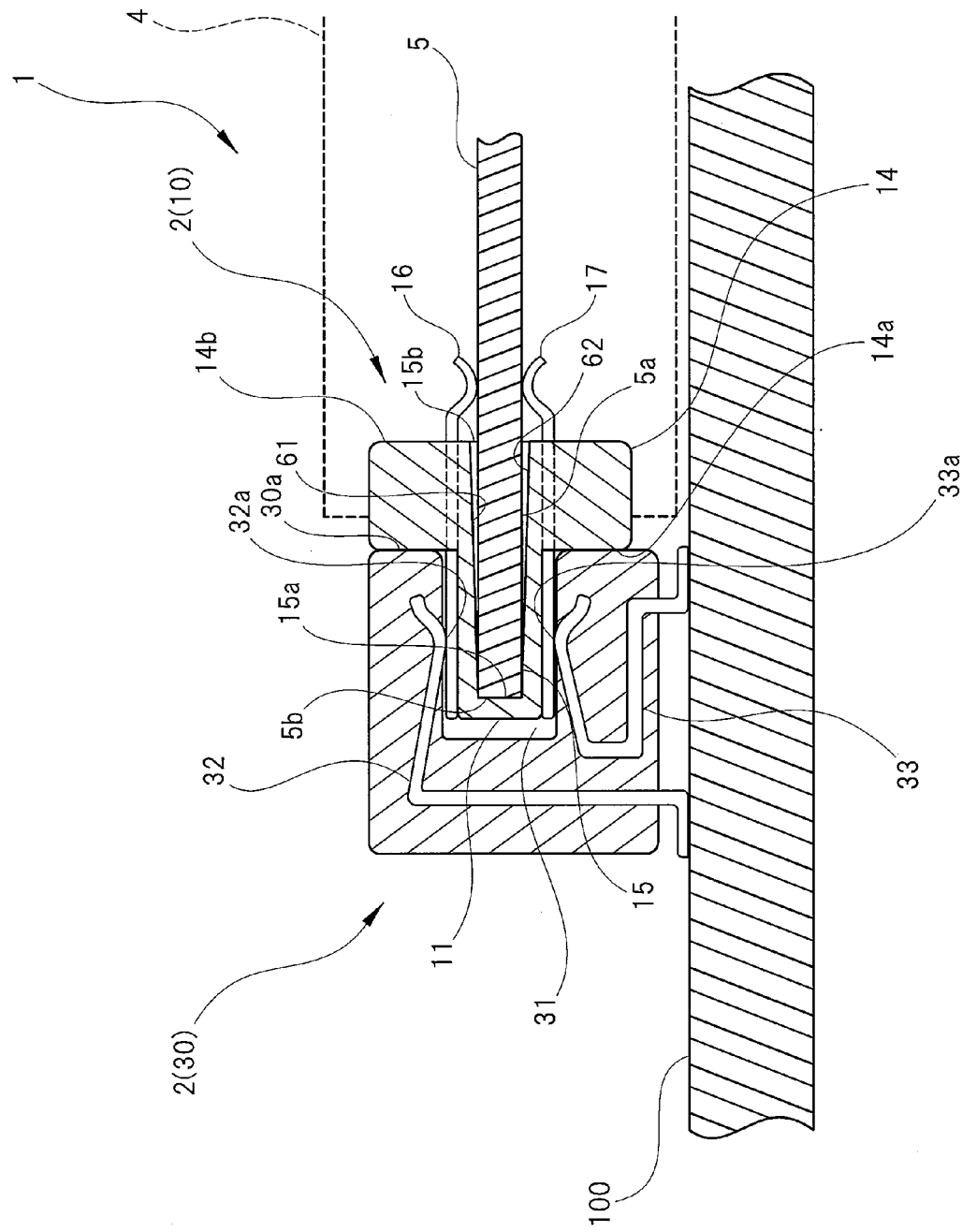
FIG. 4 is an enlarged sectional view (side sectional view) showing the connection state of the plug connector and a receptacle connector.

As shown in FIG. 1A, the receptacle connector 30 has a plurality of second electrodes built therein. Specifically, as shown in FIG. 4, the receptacle connector 30 has pairs of upper second electrodes 32 and lower second electrodes 33 built therein such that a part (contact 32a) of each upper second electrode 32 is exposed on an inner surface (upper surface) of the insertion recess 31, and a part (contact 33a) of each lower second electrode 33 is exposed on another inner surface (lower surface) of the insertion recess 31.

When the insertion projection 11 of the plug connector 10 is inserted into the insertion recess 31 of the receptacle connector 30, the front end of each upper first electrode 16 provided on the plug connector 10 comes in contact with the contact 32a of each upper second electrode 32 built in the receptacle connector 30, thus being electrically conducted. At the same time, the front end of each lower first electrode 17 provided on the plug connector 10 comes in contact with the contact 33a of each lower second electrode 33 built in the receptacle connector 30, thus being electrically conducted. Note that the upper second electrode 32 and lower second electrode 33 built in the receptacle connector 30 are bent in such a manner as shown in FIG. 4 and have elasticity. Therefore, the upper second electrode 32 of the receptacle connector 30 is kept in pressure contact with the upper first electrode 16 of the plug connector 10 by its elastic restoring force. Similarly, the lower second electrode 33 of the receptacle connector 30 is kept in pressure contact with the lower first electrode 17 of the plug connector 10 by its elastic restoring force.

When the insertion projection 11 of the plug connector 10 is inserted into the insertion recess 31 of the receptacle connector 30, at least a part of the insertion end portion 5a of the module board 5 is inserted into the insertion recess 31 of the receptacle connector 30. As shown in FIG. 4, the insertion projection 11 is inserted into the insertion recess 31 until the front surface 14a of the flange 14 abuts against the front surface 30a of the receptacle connector 30. That is, the insertion length (fitting length) of the insertion projection 11 to the insertion recess 31 is equal to the full length (L3) of the insertion projection 11 shown in FIG. 3. Meanwhile, as described above, the insertion length (L2) of the module board 5 to the insertion projection 11 is substantially the same as the full length (L3) of the insertion projection 11. As shown in FIG. 4, therefore, when the insertion projection 11 is inserted into the insertion recess 31, the part of the insertion end portion 5a that is substantially equivalent to the full length (L3) of the insertion projection 11 is inserted into the insertion recess 31.

As described above, when the plug connector 10 is connected to the receptacle connector 30, the plug connector 10 and the part of the module board 5 that is inserted into the plug connector 10 are both inserted and held in the insertion recess 31 of the receptacle connector 30.

Figure 9:
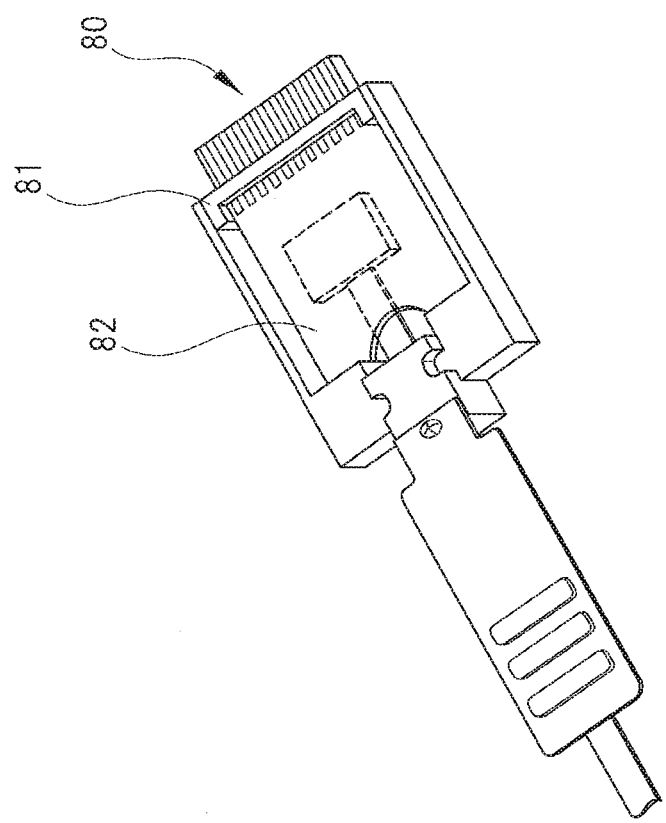
FIG. 9 is a perspective view showing an example of the internal structure of a conventional communication module.
Figure 10A:
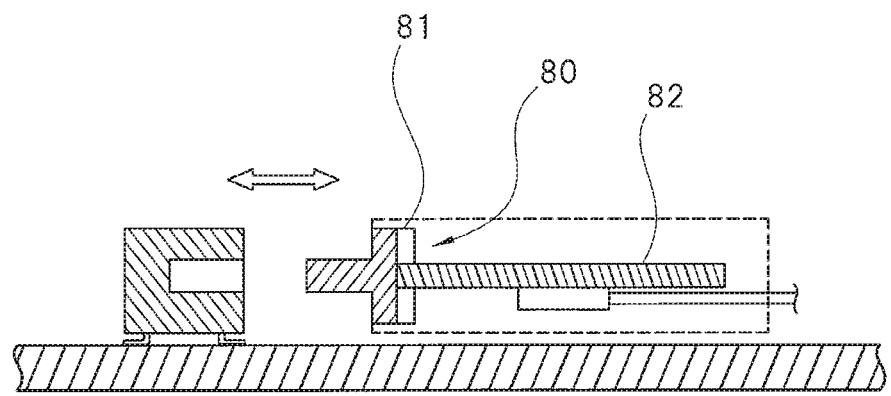
FIG. 10A is a sectional view showing an example of a conventional communication module and a conventional communication module connector.
Figure 10B:
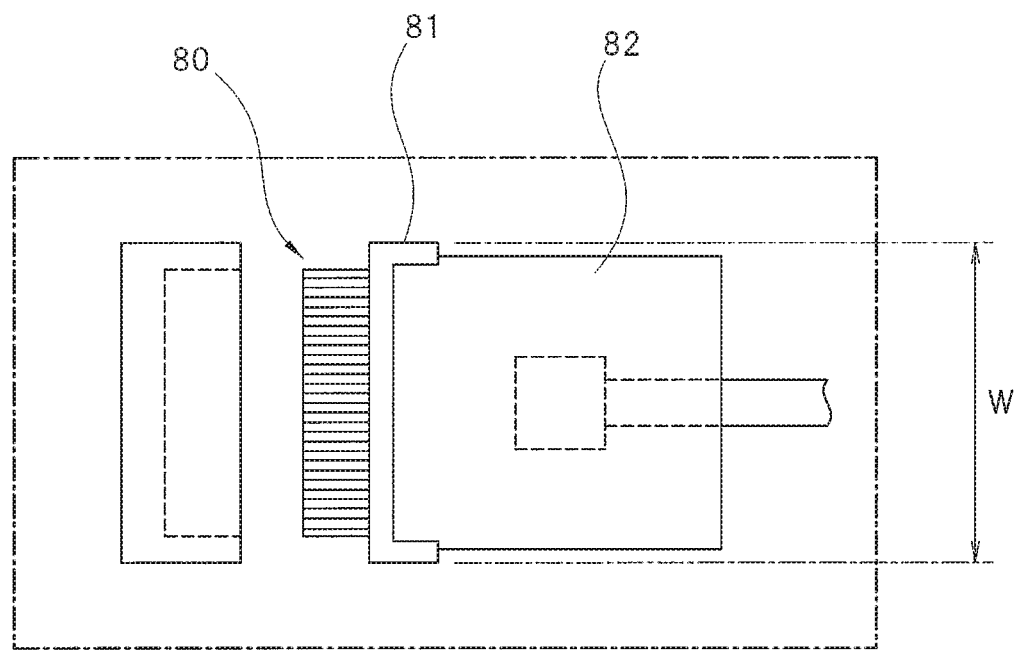
FIG. 10B is a plan view of the conventional communication module and the conventional communication module connector.

As described above, according to this embodiment, by inserting the part of the module board 5 into the board insertion portion 15 provided on the plug connector 10, the module board 5 and the plug connector 10 are fixed firmly with a high degree of accuracy without using the board holding portion 81 shown in FIGS. 9 and 10 or a member corresponding to the board holding portion 81. As a result, the width of the plug connector 10 is smaller than that in the conventional case, and the width of the communication module 1 including the plug connector 10 is also smaller than that in the conventional case. To put it another way, the communication module 1 is miniaturized, which allows mounting of the communication module 1 at higher density than before. Moreover, when the plug connector 10 is connected to the receptacle connector 30, the whole of the insertion projection 11 of the plug connector 10 and the part of the module board 5 are inserted simultaneously into the insertion recess 31 of the receptacle connector 30 and are held integrally in the insertion recess 31.

Here, the thickness of the module board 5 generally has a variation (tolerance) of about ±10%. For example, when the design value of the thickness of the module board 5 is 0.8 mm, the minimum value of the thickness of the actual module board 5 is about 0.72 mm, and the maximum value of the thickness of the actual module board 5 is about 0.88 mm. Accordingly, setting a dimension of the board insertion portion 15 of the plug connector 10 to the maximum value of the thickness of the module board 5 (for example, 0.88 mm) may generate backlash between the board insertion portion 15 and the insertion end portion 5a which is inserted into the board insertion portion 15.

Thus, in order to prevent this backlash, the present embodiment provides a plurality of adjustment projections which centers the module board 5 with respect to the thickness direction on the inside of the board insertion portion 15. Specifically, as shown in FIG. 5A, the first inner surface (upper surface 50a) of the board insertion portion 15 has a plurality of first adjustment projections 61 along the width direction of the board insertion portion 15, and the second inner surface (lower surface 50b) of the board insertion portion 15 opposed to the first inner surface (upper surface 50a) has a plurality of second adjustment projections 62 along the width direction of the board insertion portion 15.

Figure 5B:
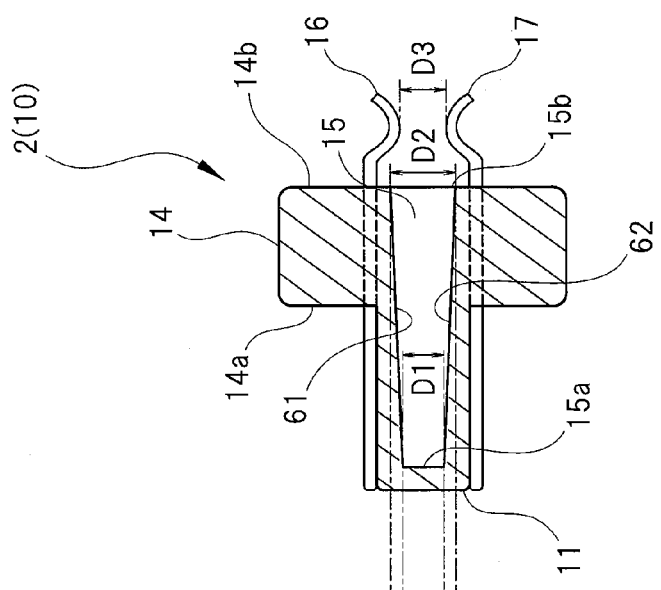
FIG. 5B is a sectional view taken along the line A-A' of FIG. 5A.
Figure 5A:
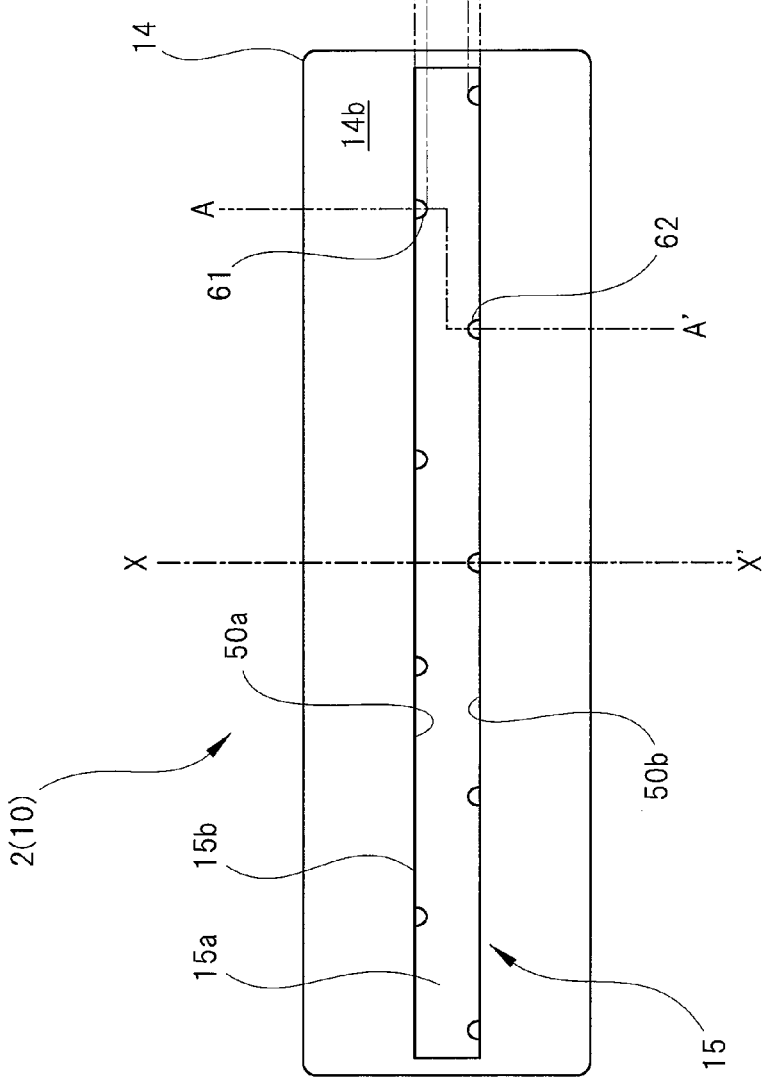
FIG. 5A is an end view showing an example of an insertion hole in which adjustment projections are provided.

As shown in FIGS. 5A and 5B, the first adjustment projections 61 and the second adjustment projections 62 have identical shape and dimension with each other. Specifically, each of the first adjustment projections 61 and the second adjustment projections 62 extends toward the bottom surface 15a from an opening 15b of the board insertion portion 15 and gains height gradually as getting closer to the bottom surface 15a. In other words, the first adjustment projections 61 provided on the upper surface 50a of the board insertion portion 15 gradually come closer to the lower surface 50b as the first adjustment projections 61 get closer to the bottom surface 15a of the board insertion portion 15. In contrast, the second adjustment projections 62 provided on the lower surface 50b of the board insertion portion 15 gradually come closer to the upper surface 50a as the second adjustment projections 62 get closer to the bottom surface 15a of the board insertion portion 15. According to this embodiment, the distance (D1) between one end (bottom surface side end) of the first adjustment projection 61 closest to the lower surface 50b of the board insertion portion 15 and one end (bottom surface side end) of the second adjustment projection 62 closest to the upper surface 50a of the board insertion portion 15 is 0.72 mm. In contrast, the distance (D2) between one end (opening side end) of the first adjustment projection 61 farthest from the lower surface 50b of the board insertion portion 15 and one end (opening side end) of the second adjustment projection 62 farthest from the upper surface 50a of the board insertion portion 15 is 0.88 mm, and this distance (D2) is equal to the height of an inlet of the board insertion portion 15. Note that the minimum distance (D3) between the rear end of the upper first electrode 16 and the rear end of the lower first electrode 17 shown in FIG. 5B is slightly shorter than the distance (D1) described above.

As shown in FIGS. 5A and 5B, the plurality of first adjustment projections 61 are parallel to each other, and the plurality of second adjustment projections 62 are parallel to each other. In addition, as shown in FIG. 5A, the plurality of first adjustment projections 61 are arranged in linear symmetry, using a line X-X' which divides the board insertion portion 15 in the arrangement direction (the width direction of the board insertion portion 15) of the first adjustment projections 61 as a symmetry axis, and the plurality of second adjustment projections 62 are also arranged in linear symmetry, using the line X-X' as a symmetry axis. As a matter of course, the first adjustment projections 61 and second adjustment projections 62 are arranged alternately along the width direction of the board insertion portion 15 and are not opposed to each other. Specifically, the second adjustment projections 62 are not present directly under the first adjustment projections 61, and the first adjustment projections 61 are not present directly above the second adjustment projections 62. Accordingly, the distance (D1) shown in FIG. 5B is not an opposing distance between the bottom surface side end of the first adjustment projection 61 and the bottom surface side end of the second adjustment projection 62. The distance (D1) is, for example, the height of the bottom surface side end of the first adjustment projection 61 when the bottom surface side end of the second adjustment projection 62 is set as a reference. Moreover, the distance (D1) is a vertical distance between a horizontal line which passes through the vertex of the first adjustment projection 61 and a horizontal line which passes through the vertex of the second adjustment projection 62. These explanations are apparent from FIG. 5B that is a sectional view taken along the line A-A' of FIG. 5A.

When the insertion end portion 5a of the module board 5 (FIGS. 3 and 4) is inserted into the board insertion portion 15 depicted in FIGS. 5A and 5B, the first adjustment projections 61 come in contact with a surface (top surface) of the insertion end portion 5a which is opposed to the upper surface 50a of the board insertion portion 15, and the second adjustment projections 62 come in contact with another surface (back surface) of the insertion end portion 5a which is opposed to the lower surface 50b of the board insertion portion 15. In this case, as the thickness of the module board 5 (insertion end portion 5a) increases, the first adjustment projections 61 and second adjustment projections 62 come in contact with the top surface and the back surface of the insertion end portion 5a at an earlier stage of insertion. In contrast, as the thickness of the module board 5 (insertion end portion 5a) decreases, the first adjustment projections 61 and second adjustment projections 62 come in contact with the top surface and the back surface of the insertion end portion 5a at a later stage of insertion. In either case, when the first adjustment projections 61 and second adjustment projections 62 come in contact with the insertion end portion 5a and then the insertion end portion 5a is inserted deeper into the board insertion portion 15, a force for pushing down and a force for pushing up the insertion end portion 5a act on the insertion end portion 5a at the same time. As a result, the insertion end portion 5a is centered in the thickness direction thereof. Moreover, the first adjustment projections 61 and second adjustment projections 62 each are arranged in linear symmetry and alternately. Accordingly, a force for pushing down and a force for pushing up equally act on the insertion end portion 5a. Hence, the insertion end portion 5a deforms elastically so as to undulate, so that the tolerance of the thickness of the insertion end portion 5a is absorbed.

According to this embodiment, the receptacle connector 30 (female connector) of the two-piece structure connector has the pairs of the upper second electrodes 32 and lower second electrodes 33 built therein, and the straight line connecting the upper contact 32a to the lower contact 33a is designed so as to perpendicularly intersect the insertion/extraction direction (directions indicated by the arrows a and b) in a side sectional view (e.g., FIG. 4). As a result, the pairs of the contacts can hold the insertion projection 11 of the plug connector 10 effectively.

According to this embodiment, the receptacle connector 30 (female connector) of the two-piece structure connector has the pairs of the upper second electrodes 32 and lower second electrodes 33 built therein. In a side sectional view (e.g., FIG. 4) of these electrodes, each upper second electrode 32 is bent acutely on its end part to expose the contact 32a, which is a part of the upper second electrode 32, on the inner surface of the insertion recess 31, and each lower second electrode 33 is bent obtusely on its end part to expose the contact 33a, which is a part of the lower second electrode 33, on the inner surface of the insertion recess 31. This allows miniaturization of the receptacle connector 30. More specifically, in FIG. 1, the receptacle connector 30 can be reduced in size in the insertion/extraction direction (directions indicated by the arrows a and b).

Figure 6:
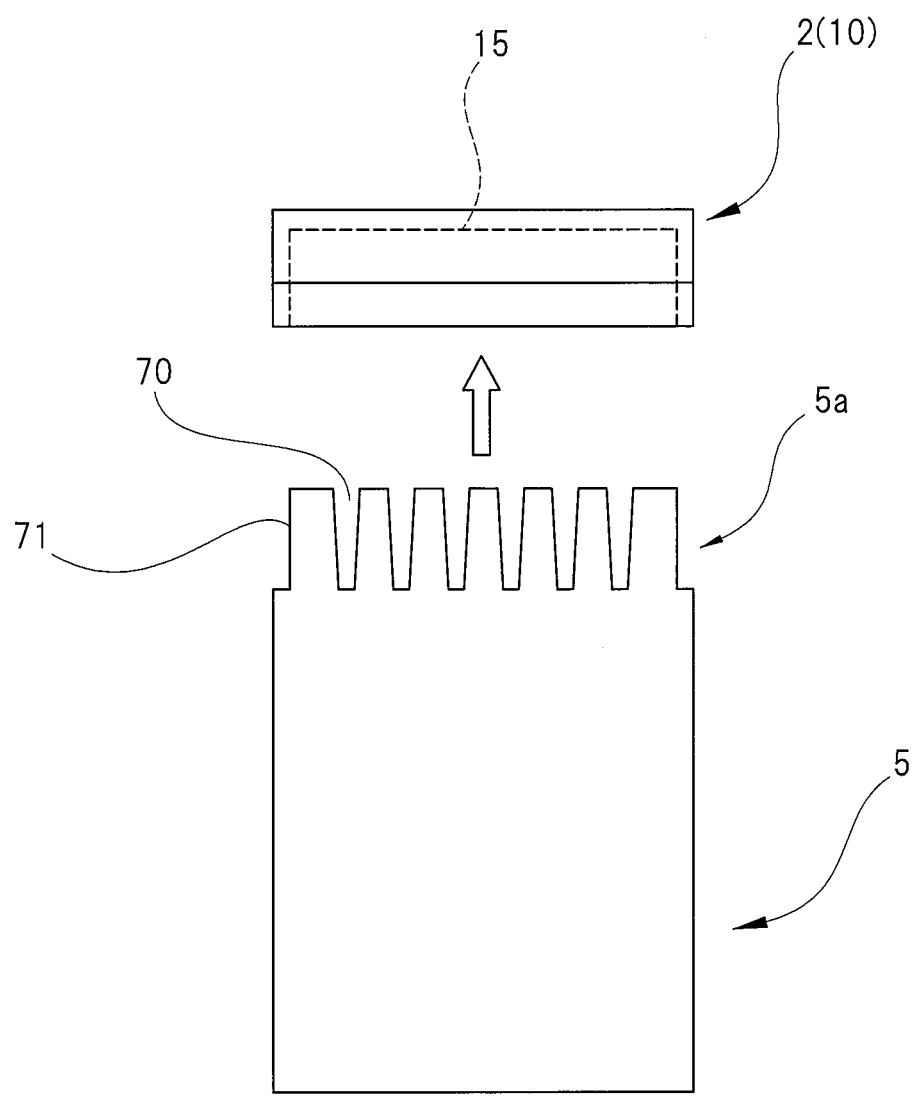
FIG. 6 is a plan view showing an example of the module board on which movable pieces are provided at an insertion end portion.

The present invention is not limited to the above embodiment and may be modified into various forms of applications without departing from the scope of the invention. For example, in order to carryout the centering of the module board by the first adjustment projections and second adjustment projections more smoothly, there is also provided an embodiment in which a plurality of movable pieces are provided at the insertion end portion of the module board. For example, as shown in FIG. 6, the insertion end portion 5a has a plurality of tongue-shaped movable pieces 71 which sandwich slits 70 therebetween to be adjacent to each other provided thereon. In other word, the insertion end portion 5a is formed in a comb-like manner. Each movable piece 71 is a cantilevered elastic piece which can be elastically deformed independently in the opposing directions of the upper surface 50a and the lower surface 50b of the board insertion portion 15 shown in FIG. 5A. Moreover, a part of the plurality of movable pieces 71 corresponds to the first adjustment projections 61, and other parts of the plurality of movable pieces 71 correspond to the second adjustment projections 62.

Figure 7:
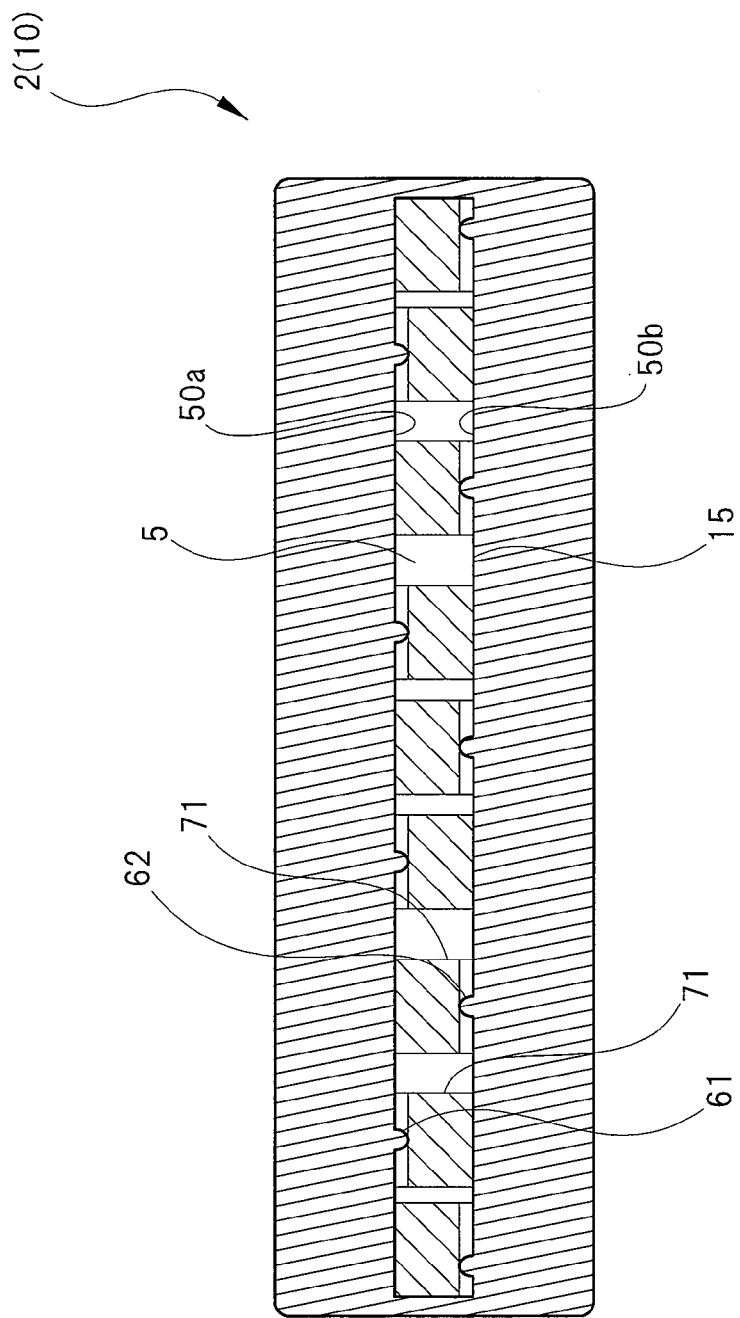
FIG. 7 is an enlarged sectional view schematically showing the deformed state of the movable pieces in the insertion hole shown in FIGS. 5A and 5B.

When the insertion end portion 5a is inserted into the board insertion portion 15 of the plug connector 10, as shown in FIG. 7, the movable pieces 71 corresponding to the first adjustment projections 61 come in contact with the first adjustment projections 61 to be pushed down, and the movable pieces 71 corresponding to the second adjustment projections 62 come into contact with the second adjustment projections 62 to be pushed up. As a result, the insertion end portion 5a is centered in relation to the thickness direction. In other word, the tolerance of the thickness of the module board 5 including the insertion end portion 5a is absorbed. In this case, the cantilevered movable piece 71 of which one end only is fixed thereto is deformed elastically with less force upward or downward, so that the centering of the module board 5 including the insertion end portion 5a is carried out more smoothly.

The insertion length of the module board to the plug connector may be changed arbitrarily provided that the module board and the plug connector are fixed together as firmly as or more firmly than in the conventional case. Specifically, the insertion length (L2) shown in FIG. 3 may be changed arbitrarily. As a matter of course, as shown in FIG. 4, when the insertion end portion 5a is inserted deeper beyond the contact between the upper first electrode 16 and the upper second electrode 32 and the contact between the lower first electrode 17 and the lower second electrode 33, a ground surface (ground layer) included in the module board 5 is interposed between the upper electrodes and the lower electrodes, thereby reducing cross-talk between the upper electrodes and the lower electrodes.

Figure 8:
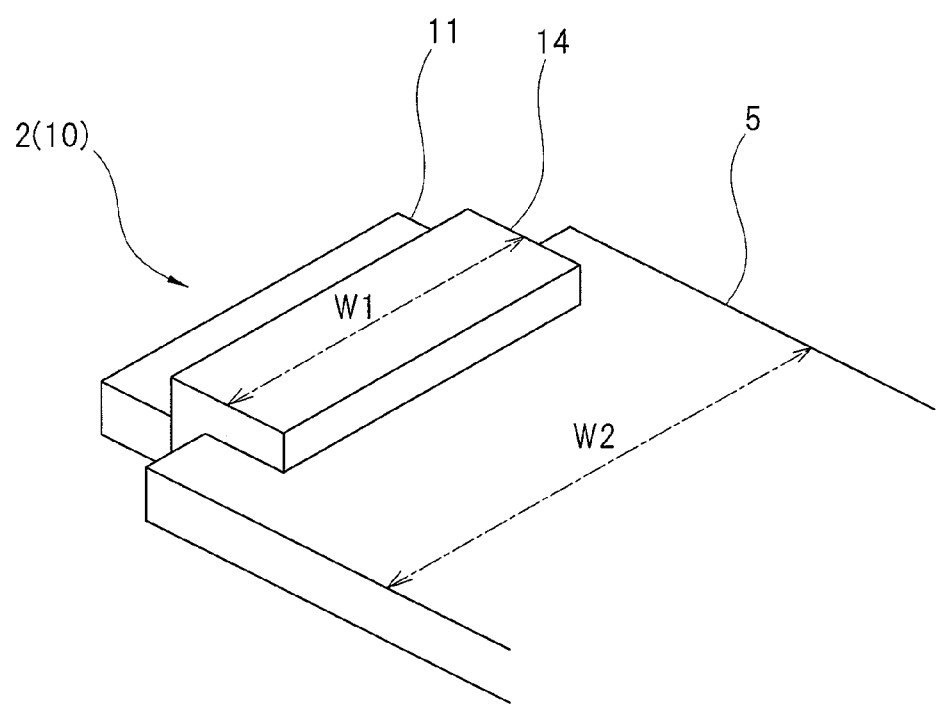
FIG. 8 is a perspective view showing still another example of the connection structure of the plug connector and the module board.

The pitch of each electrode provided on the plug connector and that of each electrode provided on the receptacle connector are not limited to 0.5 mm, respectively. To achieve high-density mounting of the communication module 1, however, the pitch of each electrode should preferably be equal to or smaller than 0.7 mm. Moreover, the width of the plug connector may not be the same as the width of the module board and may be smaller than the width of the module board. For example, as shown in FIG. 8, the width (W1) of the plug connector 10 may be smaller than the width including the parts other than the part of the module board 5 which is inserted into the plug connector 10, that is, may be smaller than the maximum width (W2) of the module board 5.

Moreover, if the sufficient thickness of the flange 14 can be ensured, the depth of the board insertion portion 15 formed inside the plug connector 10 may be determined to be a depth of such an extent that does not allow the insertion end portion 5a to be inserted into the insertion recess 31 when the insertion projection 11 is inserted into the insertion recess 31.

Further, the present invention is applied not only to a communication module and a communication module connector for optical communication, but also to a communication module and a communication module connector for electric communication. For example, the optical fiber 3 shown in FIG. 1 and the like may be replaced with a metal wire.

In another embodiment, the communication module may be provided with a nail, protrusion, or the like that are engaged with a locking portion provided on the receptacle connector or its vicinity. In this case, the pull-tab 7 shown in FIG. 2 may also serve as an operating unit that moves the nail or protrusion to disengage it from the locking portion.

What is claimed is:

1. A communication module comprising a plug connector connected to a receptacle connector,
    wherein the plug connector has an insertion projection inserted into an insertion recess provided on the receptacle connector,
    a board insertion portion into which an insertion end portion of a module board incorporated in the communication module is inserted is formed in the insertion projection,
    a plurality of first adjustment projections parallel to each other are provided on a first inner surface of the board insertion portion,
    a plurality of second adjustment projections parallel to each other are provided on a second inner surface of the board insertion portion which is opposed to the first inner surface,
    the first adjustment projections and the second adjustment projections are arranged alternately along an arrangement direction of these adjustment projections, and
    the first adjustment projections come in contact with a surface of the insertion end portion which is opposed to the first inner surface, and the second adjustment projections come in contact with another surface of the insertion end portion which is opposed to the second inner surface.

2. The communication module according to claim 1, wherein a plurality of movable pieces which can be elastically deformed independently to each other in opposing directions of the first inner surface and the second inner surface are provided at the insertion end portion,
the first adjustment projections come in contact with a part of the plurality of movable pieces, and
the second adjustment projections come in contact with the movable pieces different from the movable pieces with which the first adjustment projections are in contact.

3. The communication module according to claim 1, wherein a width of the plug connector is equal to or smaller than a maximum width of the module board.

4. The communication module according to claim 1, comprising:
a plurality of first electrodes provided on the insertion projection at a given pitch,
wherein when the insertion projection is inserted into the insertion recess, the plurality of first electrodes come in contact with a plurality of second electrodes which are provided on the inside of the insertion recess, respectively, to electrically conduct, and
the insertion end portion is inserted into the insertion recess deeper beyond a contact between the first electrode and the second electrode.

5. The communication module according to claim 4, wherein a pitch of the first electrodes is 0.7 mm or less.

6. A communication module connector comprising:
a plug connector; and
a receptacle connector to which the plug connector is connected,
wherein the plug connector has an insertion projection,
the receptacle connector has an insertion recess into which the insertion projection is inserted,
a board insertion portion into which an insertion end portion of a module board incorporated in a communication module including the plug connector is inserted is formed in the insertion projection,
a plurality of first adjustment projections parallel to each other are provided on a first inner surface of the board insertion portion,
a plurality of second adjustment projections parallel to each other are provided on a second inner surface of the board insertion portion which is opposed to the first inner surface,
the first adjustment projections and the second adjustment projections are arranged alternately along an arrangement direction of these adjustment projections, and
the first adjustment projections come in contact with a surface of the insertion end portion which is opposed to the first inner surface, and the second adjustment projections come in contact with another surface of the insertion end portion which is opposed to the second inner surface.

7. The communication module connector according to claim 6, wherein a plurality of movable pieces which can be elastically deformed independently to each other in opposing directions of the first inner surface and the second inner surface at the insertion end portion,
the first adjustment projections come in contact with a part of the plurality of movable pieces, and
the second adjustment projections come in contact with the movable pieces different from the movable pieces with which the first adjustment projections are in contact.

8. The communication module connector according to claim 6, wherein a width of the plug connector is equal to or smaller than a maximum width of the module board.

9. The communication module connector according to claim 6, comprising:
a plurality of first electrodes provided on the insertion projection at a given pitch; and
a plurality of second electrodes provided on the insertion recess at the same pitch as the first electrodes,
wherein when the insertion projection is inserted into the insertion recess, the first electrodes and the second electrodes come in contact with each other to electrically conduct, and
the insertion end portion is inserted into the insertion recess deeper beyond a contact between the first electrode and the second electrode.

10. The communication module connector according to claim 9, wherein a pitch of the first electrodes and the second electrodes is 0.7 mm or less.

* * * * *